United States Patent [19]

DiPietro

[11] Patent Number: 5,236,621
[45] Date of Patent: * Aug. 17, 1993

[54] FLUORESCENT PIGMENTS

[75] Inventor: Thomas C. DiPietro, Norton, Ohio

[73] Assignee: Day-Glo Color Corp., Cleveland, Ohio

[ * ] Notice: The portion of the term of this patent subsequent to Mar. 16, 2009 has been disclaimed.

[21] Appl. No.: 869,854

[22] Filed: Apr. 15, 1992

Related U.S. Application Data

[63] Continuation of Ser. No. 542,497, Jun. 25, 1990, abandoned, which is a continuation of Ser. No. 409,099, Sep. 19, 1989, abandoned.

[51] Int. Cl.$^5$ .............................................. C09K 11/02
[52] U.S. Cl. ............................ 252/301.35; 252/301.16
[58] Field of Search ...................................... 252/301.35

[56] References Cited

U.S. PATENT DOCUMENTS

| | | | |
|---|---|---|---|
| 2,657,195 | 10/1953 | Toland | 252/301.35 |
| 2,938,873 | 5/1960 | Kazenas | 252/301.35 |
| 3,181,949 | 5/1965 | Koerber et al. | 252/301.35 |
| 3,198,741 | 8/1965 | Kazenas | 252/301.35 |
| 3,412,036 | 11/1968 | McIntosh | 525/509 |
| 3,812,054 | 5/1974 | Noetzel et al. | 252/301.35 |
| 3,915,884 | 10/1975 | Kazenas | 252/301.35 |
| 3,922,232 | 11/1975 | Schein | 252/301.35 |
| 4,975,220 | 12/1990 | Streitel | 252/301.35 |

Primary Examiner—Prince Willis, Jr.
Assistant Examiner—Alan D. Diamond
Attorney, Agent, or Firm—Calfee, Halter & Griswold

[57] ABSTRACT

A thermoplastic, organic, fluorescent pigment affording good viscosity control in solvent. A one-pot production of the pigment. Pigment having a fluorescent dye and a polymer matrix containing a dicarboxylic acid, an organic diamine and, optionally, alkanolamine, aliphatic alkanolamine, aliphatic diol, cycloaliphatic diol, modifiers, and cross-linkers.

8 Claims, 2 Drawing Sheets

FLUORESCENT PIGMENTS

CROSS REFERENCE TO RELATED APPLICATIONS

This is a continuation of copending application Ser. No. 07/542,497 filed on Jun. 25, 1990 (now abandoned), which is a continuation in part of copending application Ser. No. 07/409,099 filed Sept. 19, 1989 (now abandoned).

BACKGROUND

Unlike conventional organic pigments, which are usually precipitated single components, fluorescent pigments are solid state solutions of common fluorescent dyes in polymeric resins or matrices. Today's fluorescent pigment industry relies heavily on matrices that are formed by melt condensation of melamine, formaldehyde, and toluenesulfonamide. In order to manufacture products that possess the requisite resistance to many common organic solvents utilized in the paint and printing ink industries, the formaldehyde based products are formulated to yield thermosetting materials. These products are typically manufactured in a two-stage process, in which the resinous B-stage is converted to the C-stage by baking with convection ovens or infra-red panels. With some difficulty, the high molecular weight thermoset materials are reduced in particle size by conventional grinding methods.

Because two steps plus grinding are involved, a lot of waste occurs in the production of the conventional thermoset pigments.

These pigments have been used in a variety of solvents; however, they have a tendency to swell in many organic solvents. Swelling of the polymer matrix increases the viscosity of the solvent vehicle used in applying the pigments to various substrates. Viscosity increases and concomitant polymer swelling result in a shortened product shelf life, and in some instances, undesirable performance.

It is an object of the invention to provide a fluorescent pigment which affords good viscosity control when placed in a solvent. That is, the viscosity level of the solvent containing the pigment is stable with aging because the pigment resists swelling and dissolution.

Today, free formaldehyde is an environmental concern. It is difficult to totally remove unreacted formaldehyde from existing thermoset pigments. For this reason, it is an object of this invention to provide a product which does not require formaldehyde.

SUMMARY OF THE INVENTION

The product of this invention is a fluorescent pigment which is thermoplastic. This thermoplastic pigment is not based on formaldehyde and thus does not require the use of this ecologically undesirable compound. Furthermore, the pigment can be made in a one step process and then ground to the desired particle size.

The fluorescent pigment includes from eight-five (85) to ninety-nine (99) weight percent polymer matrix and from one (1) to fifteen (15) weight percent fluorescent dye, the weight percent being based on the combined weight of the polymer matrix and dye.

The polymer matrix is a polymer containing from fifty-five (55) to seventy-five (75) weight percent aromatic dicarboxylic acid based on the weight of the matrix. More preferably, the matrix contains from fifty-five (55) to sixty-five (65) percent aromatic dicarboxylic acid. Most preferably, the matrix contains from fifty-eight (58) to sixty-five (65) weight percent aromatic dicarboxylic acid.

The matrix contains from five (5) to twenty-five (25) weight percent of a diamine, based on the weight of the matrix. The diamine can be an aliphatic diamine having from two (2) to six (6) carbon atoms or a cycloaliphatic diamine having from four (4) to eight (8) carbon atoms. More preferably, the diamine will represent from five (5) to fifteen (15) weight percent of the matrix.

The matrix can also include from zero (0) to thirty (30) weight percent, based on the weight percent of the matrix, of at least one of the monomers listed below:

an aliphatic alkanolamine having from two (2) to five (5) carbon atoms, an aliphatic diol having from two (2) to five (5) carbon atoms, and a cycloaliphatic diol having from six (6) to eight (8) carbon atoms.

More preferably, these optional monomers will be present in from fifteen (15) to thirty (30) weight percent, and most preferably from fifteen (15) to twenty-five (25) weight percent.

The matrix will also include from five (5) to fifteen (15) weight percent of modifier based on the weight of the matrix. These modifiers can be included to increase molecular weight by chain extension, alter softening or melting point of the matrix, provide enhanced compatibility with dyes, resistance to solvents, provide functional groups of special affinity for particular fluorescent dyes, impart thermal stability to fluorescent dyes, or otherwise complement or enhance the suitability of the resin-carrier composition for a particular application. Preferred modifiers include bifunctional and monofunctional organic acids, monofunctional organic amines, monofunctional organic alcohols, metal oxides, metal carbonates, and metal acetates. More preferably, from five (5) to ten (10) weight percent of the polymer matrix will be modified.

From zero (0) to ten (10) weight percent cross-linker can also be added, weight percent being based on the weight of polymer matrix. From three (3) to six (6) weight percent cross-linker is preferred. Traditional cross-linkers can be used. Most preferred are the polyols although other cross-linkers known to those skilled in the art can be determined and utilized with a reasonable amount of experiment.

The thermoplastic pigment of this invention finds particularly good resistance to organic solvent, hereinafter called solvent. An illustrative, but not exhaustive list of the solvents which can be utilized includes ketones, esters, some alcohols, aliphatic solvents, aromatic solvents, chlorinated hydrocarbons, and some glycol ethers.

The polymer matrix is formed using the above reactants. Generally condensation polymerization will occur using the aromatic dicarboxylic acid and a diamine with the optional aliphatic alkanolamines, aliphatic diols and cycloaliphatic diols. The matrix can be modified using the chemicals described above and/or crosslinked. The final matrix is thermoplastic and can be re-heated until it becomes soft and mixable with the fluorescent dye. When the matrix is mixed with the fluorescent dye, it can be allowed to cool. Once cooled, the matrix can be comminuted to form pigment particles in the range from 0.5 to 20 microns, and more preferably from 1 to 10 microns.

The molecular weight of the polymer is preferably within the range of from 500 to 5000, and more preferably from within the range of 500 to 2000. The low molecular weight pigments produced are designed to be friable to facilitate the grinding needed to produce the ultimate pigment particle.

The monomers utilized to produce the polymer backbone are chosen to impart a crystallinity into the polymer structure. Crystallinity affords the polymer matrix with unusually good solvent resistance at very low molecular weight. Some amide/amide linkages formed by the reaction of aliphatic or cycloaliphatic diamine with aromatic dicarboxylic acid provide this crystallinity. The crystallinity and melting point characteristics are modified utilizing alkanolamines, aliphatic diols and cycloaliphatic diols.

Ester/ester and ester/amide linkages in the polymer matrix have different, albeit sometimes subtle affects on different dyes, affecting characteristics such as color brightness and brilliance. Thus, adjustment with alkanolamines and diol permits tailoring the matrix for particular dyes. Proper adjustment can be readily achieved without undue experimentation.

THE DICARBOXYLIC ACIDS

As indicated above, the starting dicarboxylic acids or their esters or acid chlorides may be selected from such acids as isophthalic acid, terephthalic acid, 2,6-naphthalene dicarboxylic acid, and mixtures thereof. Of the acids, isophthalic acid is preferred.

The polymer matrix is a polymer containing from fifty-five (55) to seventy-five (75) weight percent aromatic dicarboxylic acid based on the weight of the matrix. More preferably, the matrix contains from fifty-five (55) to sixty-five (65) percent aromatic dicarboxylic acid. Most preferably, the matrix contains from fifty-eight (58) to sixty-five (65) weight percent aromatic dicarboxylic acid.

THE DIAMINES

The diamine used to produce the resin is of the general formula:

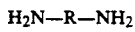

$$H_2N-R-NH_2$$

wherein R is a straight chain alkylene group preferably containing from 2-6 carbon atoms, most preferably from 2-4 or a cycloalkylene group containing from 4-8 carbon atoms. Representative diamines include ethylenediamine, propylenediamine, and trans 1,4-diaminocyclohexane. The diamines increase the melting point of the base polymer. If too high a melting point is achieved, the product cannot be processed because the melt is too viscous. Depending on the equipment, a melting point differential of 50° C. should be maintained. The upper limits are determined by the thermal stability of the dye and/or the base polymer.

THE ALKANOLAMINES

The alkanolamines used to produce the resin are of the general formula:

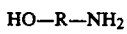

$$HO-R-NH_2$$

wherein R is a straight chain alkylene group containing from 2-5 carbon atoms, or more preferably containing from 2-3 carbon atoms. Representative alkanolamines include ethanolamine and propanolamine. The ester/amide linkages formed in the polymer by use of alkanolamines tend to produce a lower melt product than do the amide/amide linkages afforded by the diamines.

THE POLYHYDRIC ALCOHOL

These alcohols, in a preferred embodiment of the invention, are either cycloaliphatic or aliphatic. The cycloaliphatic polyhydric alcohols preferably contain not more than eight (8) carbon atoms, and most preferably 6-8 carbon atoms in the ring. The aliphatic polyhydric alcohols preferably contain 2-5 carbon atoms. Illustrative of these alcohols are ethylene glycol, propylene glycol, and cyclohexanedimethanol. The ester/ester linkages formed in the polymer backbone tend to produce a lower melt product than do amide/ester linkages. By varying the amount of diamine, alkanolamine, and diol, the melt characteristic of the polymer matrix can be modified to produce a product with a low enough melt temperature to provide adequate dye incorporation without unduly decomposing either the dye or the polymer matrix.

CROSS-LINKING AGENTS

Moderate cross-linking, less than 10% and preferably less than 6%, can be used to increase the base polymer solvent resistance. Generally, cross-linking agents should result in a base polymer size increase without causing gel formation. The most preferred cross-linking agents are polyols which are defined here to be alcohols containing three (3) or more hydroxy groups. Exemplary polyols are glycerine and pentaerythritol, dipentaerythritol and trimethylolpropane. Other cross-linkers can be used also. Although, gelation has occurred using diisopropanolamines and diethenolamine, these should be usable as cross-linkers with appropriate adjustment of the polymer matrix and of the dosage. The term cross-linker here also includes branching agents.

THE FLUORESCENT DYES

The fluorescent dyes employed in the composition include fluorescent organics which are brilliantly fluorescent when in solution. These daylight fluorescent-types are well known in the art, and belong to the dye families known as benzothioxanthene, xanthene, coumarin, naphthalimide, benzoxanthene, and acridine. Typical dyes include Basic Red 1, Basic Violet 10, Basic Violet 11, Basic Violet 16, Basic Yellow 40, Solvent Yellow 43, Solvent Yellow 44, Solvent Yellow 131, and Solvent Yellow 135. The fluorescent dyes comprise from 0.1 to about 15% of the total weight of the pigment. All these dyes have been tested and produce acceptable brilliant fluorescent pigments.

THE PIGMENT

The pigment is usually formed by incorporating the fluorescent dye in the condensation resin during its formation and thereafter grinding the cooled resin to the proper particle size. This average particle size may range from about 0.1 to about 200 microns. A preferred average particle size range is from 1 to 10 microns, and most preferred average particle size is 2-10 microns. Alternatively, the fluorescent dye can be added to the resin in a separate step after the resin is formed. The resin has been found to be friable and easily ground. This grinding is done in a conventional manner.

OPTIONAL INGREDIENTS

In addition to the foregoing components, the fluorescent composition of the present invention may be modified by inclusion of other ingredients which may react with acid, amine, and/or alcohol components. Modifiers can be included to increase the molecular weight by chain extension, alter the softening or melting point, provide enhanced compatibility, provide functional groups of special affinity for particular fluorescent dyes, impart thermal stability to fluorescent dyes, or otherwise complement or enhance the suitability of the resin carrier composition for a particular application. Preferred modifiers include bi- and mono functional acids, monofunctional amines, monofunctional alcohols, metal oxides, metal carbonates, and metal acetates. Examples of such modifiers include the following compounds.

Illustrative bifunctional acids include p-aminobenzoic acid and p-hydroxybenzoic acid.

Illustrative monofunctional acids include benzoic acid and cyclohexanecarboxylic acid.

Illustrative monofunctional amines include cyclohexylamine and benzylamine.

Illustrative monofunctional alcohols include benzyl alcohol and cyclohexanol.

Illustrative metal oxides, metal carbonates, and metal acetates, include zinc oxide, zinc carbonate, antimony triacetate, antimony pentoxide, antimony trioxide, calcium oxide, calcium carbonate, calcium hydroxide, magnesium oxide, and magnesium carbonate.

The amount of modifier used should not adversely affect the basic novel properties of the fluorescent composition. Usually, the amount of the reactive modifier will range from about one-tenth (0.1) to fifteen (15) percent, based on the total weight of the composition. These modifiers can also be used as chain terminators.

Conventional additives such as opacifiers, antioxidants, ultraviolet absorbers, and processing aids, may also be added to the fluorescent pigments. These materials may be added prior to, during, or after the condensation reaction is completed. In addition, the reaction can be catalyzed by use of catalyst such as are described in U.S. Pat. No. 3,922,232, which is incorporated herein by reference.

GENERAL METHOD OF PREPARING THE POLYMERS

The compositions of the present invention are prepared by condensation polymerization reactions illustrated by the following examples. The compositions are prepared by heating a mixture of the reactants to effect polymerization thereof. Polymerization is typically completed with heating to a maximum temperature from about 200° to about 270° C. and providing an adequate dwell time to complete the reaction as evidence by the cessation of water production. Fluorescent dye is then added with stirring.

EXAMPLE 1

To a reaction vessel equipped with an agitator, heat source, nitrogen sparge, and condenser designed to remove the water of reaction, was charged 192.3 g of ethanolamine and 47.9 g of trans 1,4-diaminocyclohexane. To the blended components 76.9 g of benzoic acid and 540.5 g of isophthalic acid was added.

The components were heated to 230° C. and held for 120 minutes. A strong red pigment is provided by adding a combination of fluorescent dyes to the batch after 120 minutes at 230° C. The resin was cooled to room temperature and ground.

EXAMPLE 2

To a reaction vessel equipped as in Example 1, was charged 64.1 g of ethanolamine, 27.9 g of ethylene glycol, and 22.3 g of trans 1,4-diaminocyclohexane. To the blended components, 36.6 g of benzoic acid and 257.0 g of isophthalic acid was added.

The components were heated to 220° C. and held for 140 minutes. A strong orange pigment is provided by adding a combination of fluorescent dyes to the batch after 140 minutes at 220° C. The resin was cooled to room temperature and ground.

EXAMPLE 3

To a reaction vessel equipped as in Example 1, was charged 73.2 g ethanolamine, 48.0 g of cyclohexanedimethanol (90%), and 22.8 g of trans 1,4-diaminocyclohexane. To the blended components, 36.6 g of benzoic acid and 257 g of isophthalic acid was added.

The components were heated to 220° C. and held for 120 minutes. A strong orange pigment is provided by adding a combination of fluorescent dyes to the batch after 120 minutes at 220° C. The resin was cooled to room temperature and ground.

EXAMPLE 4

To a reaction vessel equipped as in Example 1, was charged 50.6 g of ethanolamine, 34.2 g of ethylenediamine, and 13.8 g of pentaerythritol. To the blended components, 50.6 g of benzoic acid and 230 g of isophthalic acid was added.

The components were heated to 220° C. and held for 90 minutes. A strong pink pigment is provided by adding a combination of fluorescent dyes to the batch after 90 minutes at 220° C. The resin was cooled to room temperature and ground.

EXAMPLE 5

To a reaction vessel equipped as in Example 1, was charged 79.3 g of ethanolamine and 24 g of ethylenediamine. To the blended components, 36.6 g of benzoic acid, 137.5 g of tetephthalic acid and 137.5 g of isophthalic acid was added.

The components were heated to 250° C. and held for 120 minutes. A strong yellow pigment is provided by adding a fluorescent yellow dye to the batch after 120 minutes at 250° C. The resin was cooled to room temperature and ground.

EXAMPLE 6

To a reaction vessel equipped as in Example 1, was charged 91.5 g of ethanolamine and 22.8 g of trans-1,4-diaminocyclohexane. To the blended components, 228 g of isophthalic acid, 36.6 g of benzoic acid and 17.8 g of dimethyl-2,6-naphthalene dicarboxylate was added.

The components were heated to 240° C. and held for 120 minutes. A strong red pigment is provided by adding a combination of fluorescent dyes to the batch after 120 minutes at 230° C. The resin was cooled to room temperature and ground.

THE FIGURE

VISCOSITY CONTROL

Figure 1:
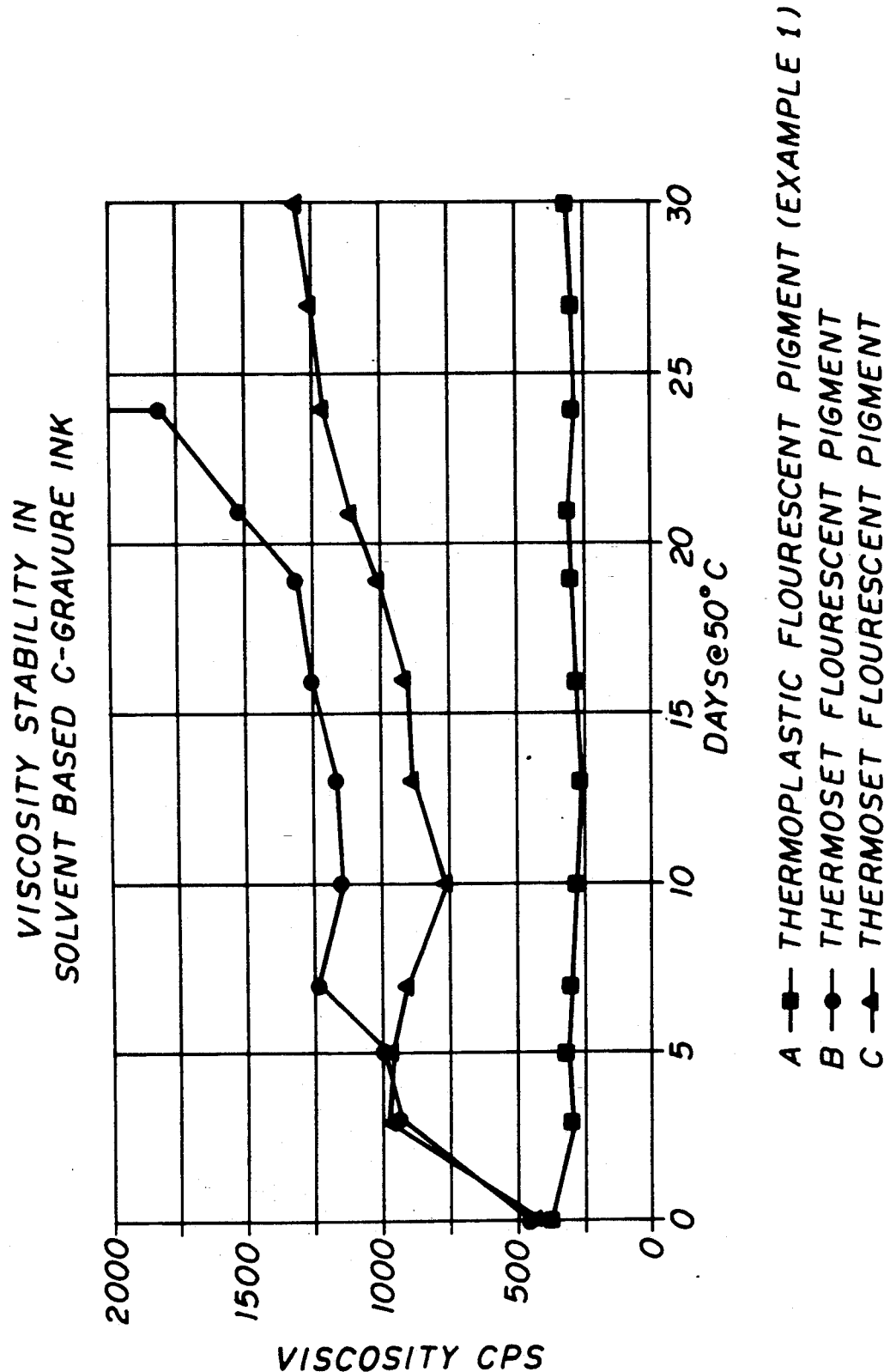
FIG. 1 is a viscosity versus time plot for pigments in a solvent based ink.
Figure 2:
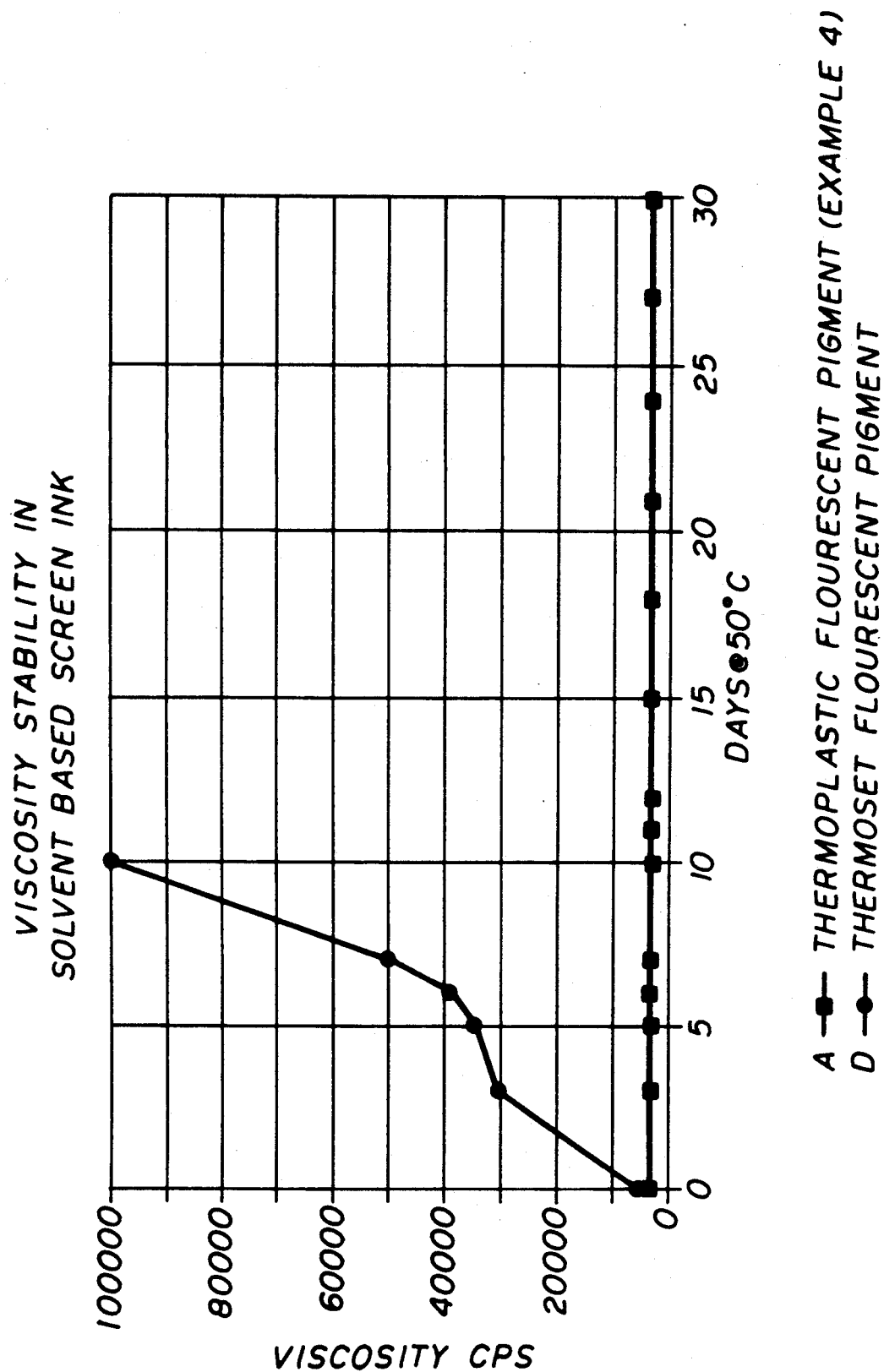
FIG. 2 is a viscosity versus time plot for pigments in a solvent based ink.

Viscosity control of pigments is afforded by the pigments of this invention. Attached are two FIGS. I and II. FIGS. I and II compare the pigment of this invention with thermoset pigments on a viscosity versus time basis using testing procedures used throughout the industry. According to those standards pigment, binder, and solvent are mixed and the components of each adjusted to provide a predetermined initial viscosity. The systems are then aged at 50° C.

The solvent resistance of the pigments of this invention are readily demonstrated by the relatively constant viscosity of the solvent containing the pigment over a period of thirty days. This is contrasted with the thermoset pigments in the same solvent. For thermoset pigments, dissolution of the polymer is evidenced by increase in viscosity with time. For the comparisons, commercially available thermoset fluorescent pigments B, C, and D were used. Good viscosity control was observed for each of the thermoplastic fluorescent pigments produced in Examples 1-4. The solvent used in FIG. I example is a typical C-Gravure solvent containing solvent blend 90-75% toluene and, 10-25% N-propylacetate. The pigment made according to Example 1 was used.

The solvent used in FIG. II is a Vinyl Screen Ink Solvent: 1-Methoxy-2-Propylacetate. The pigment made according to Example 4 was used. Generally, a solvent will work as long as it does not substantially solubilize the pigment. Included below are additional solvents which have been tested with positive results similar to those illustrated in FIG. II:

| Methylacetate | Butylacetate | Trichloroethylene |
| Ethylacetate | N-Propanol | Perchloroethylene |
| N-Propylacetate | Isopropanol | Ethyleneglycol monobutylether |
| Isopropylacetate | N-butanol | Diethyleneglyco-monobutylether |
| Acetone | Xylene | Glycerine |
| Methylethylketone | Toluene | Dioctylphthalate |
| Methylisobutylketone | Hexane | Dioxononylphthalate |
| Diisobutylketone | Heptane | Lactol Spirits |
| Mineral spirits | V.M. & P Naphtha | |

Failure occurred in the following solvents; when compared to the FIG. II solvents:

| Methanol | Ethanol |
| Water | Cyclohexanone |
| Ethyleneglycol | Ethylene glycol monomethylether |
| Methylene chloride | |

Generally, a solvent system will work according to the invention as long as the solvent system is less hydrophilic than the ones listed above for which failure occurred. More specifically, the solvent system should work as long as the system is less hydrophilic than methylene chloride.

Having described my invention, I claim as follows:

1. A fluorescent pigment comprising:
   from 0.10 to 15.0 weight percent, based on total weight of pigment, of a fluorescent dye; and
   from 85-99.9 weight percent, based on total weight of pigment, of a thermoplastic condensation polymer, said thermoplastic condensation polymer assembled from monomers comprising:
   a) from about 55.0 to about 75.0 weight percent, based on the thermoplastic condensation polymer weight of an aromatic dicarboxylic acid;
   b) from about 5.0 to about 25.0 weight percent, based on the thermoplastic condensation polymer weight of a diamine selected from the group consisting of: an aliphatic diamine having from 2-6 carbon atoms; cycloaliphatic diamines having from 4-8 carbon atoms; or mixtures thereof; and
   c) from 0.0 to about 30.0 weight percent, based on the thermoplastic condensation polymer weight of at least one monomer selected from the group consisting of: an aliphatic alkanolamine having from 2-5 carbon atoms; an aliphatic diol having from 2-5 carbon atoms; and a cycloaliphatic diol having not more than 8 carbon atoms; and mixtures thereof.

wherein said pigment is insoluble in acetone and said pigment further characterized by having an average particle size from about 0.1-200 microns.

2. The pigment of claim 1 further including up to ten (10) weight percent cross-linker based on the weight of polymer matrix.

3. The pigment of claim 2 wherein the cross-linker is from three (3) to six (6) weight percent.

4. A fluorescent pigment of claim 2;
   wherein the aromatic dicarboxylic acid is selected from the group consisting of isophthalic acid, terephthalic acid and 2,6-naphthalene dicarboxylic acid;
   wherein the diamine is selected from the group consisting of ethylene diamine, propylene diamine and trans-1,4-diaminocyclohexane;
   wherein the aliphatic alkanol amine is selected from the group consisting of ethanolamine, propanolamine; wherein the aliphatic diol is selected from the group consisting of ethylene glycol, propylene glycol;
   wherein in the cycloaliphatic diol is cyclohexane dinethanol;
   further comprising a modifier selected from the group consisting of p-aminobenzoic acid, p-hydroxybenzoic, benzoic acid, cyclohexane carboxylic acid, cyclohexylamine, benzylamine, benzyl alcohol, cyclohexanol, zinc oxide, zinc carbonate, antimony triacetate, antimony pentoxide, antimony trioxide, calcium oxide, calcium carbonate, calcium hydroxide, magnesium hydroxide, magnesium oxide and magnesium carbonate;
   wherein in the cross-linker is selected from the group consisting of glycerine, pentaerythritol, dipentaerythritol, and trimethylol propane;
   and the dye is selected from the group consisting of a xanthene, a denzothioxanthene, a coumarin, a naphthalimide, a benzoxanthene and an acridine.

5. A fluorescent pigment comprising:
   1) from 0.10 to 15.0 weight percent fluorescent dye, weight percent based on the total pigment weight;
   2) from 85.0 to 99.9 weight percent, based on the total pigment weight, of a thermoplastic condensation polymer, said polymer assembled from monomers comprising:

a) from about 58.0 to 65.0 weight percent, based on said thermoplastic condensation polymer, weight of an aromatic dicarboxylic acid;

b) from about 5.0 to 15.0 weight percent, based on said thermoplastic condensation polymer weight, of a diamine selected from the group consisting of aliphatic diamines having from 2–6 carbon atoms and cycloaliphatic diamines having from 4–8 carbon atoms;

c) from about 10.0 to 20.0 weight percent, based on said thermoplastic condensation polymer weight, of a monomer selected from the group consisting of: an aliphatic alkanolamine having from 2–5 atoms; an aliphatic diol having from 2–5 carbon atoms; and a cycloaliphatic diol having from 6–8 carbon atoms; and said pigment is insoluble in acetone and said pigment is further characterized by having an average particle size from about 0.1–200 microns.

6. The pigment of claim 5 further including up to ten (10) weight percent cross-linker based on the weight of polymer matrix.

7. The pigment of claim 6 wherein the cross-linker is from three (3) to six (6) weight percent.

8. A fluorescent pigment of claim 7;

wherein the aromatic dicarboxylic acid is selected from the group consisting of isophthalic acid, terephthalic acid and 2,6-naphthalene dicarboxylic acid;

wherein the diamine is selected from the group consisting of ethylene diamine, propylene diamine and trans-1,4-diaminocyclohexane;

wherein the aliphatic alkanol amine is selected from the group consisting of ethanolamine, propanolamine; wherein the aliphatic diol is selected from the group consisting of ethylene glycol, propylene glycol; wherein in the cycloaliphatic diol is cyclohexane dinethanol;

further comprising a modifier selected from the group consisting of p-aminobenzoic acid, p-hydroxybenzoic, benzoic acid, cylcohexane carboxylic acid, cyclohexylamine, benzylamine, benzyl alcohol, cyclohexanol, zinc oxide, zinc carbonate, antimony triacetate, antimony pentoxide, antimony trioxide, calcium oxide, calcium carbonate, calcium hydroxide, magnesium hydroxide, magnesium oxide and magnesium carbonate;

wherein in the cross-linker is selected from the group consisting of glycerine, pentaerythritol, dipentaerythritol, and trimethylol propane;

and the dye is selected from the group consisting of a xanthene, a denzothioxanthene, a coumarin, a naphthalimide, a benzoxanthene and an acridine.

* * * * *